United States Patent
Pote et al.

(10) Patent No.: US 8,838,771 B2
(45) Date of Patent: Sep. 16, 2014

(54) ENABLING VOIP CALLS TO BE INITIATED WHEN A CALL SERVER IS UNAVAILABLE

(75) Inventors: Parag Narayanrao Pote, Bangalore (IN); Sudhakar Valluru, Sunnyvale, CA (US); Ganesh Pai, Lexington, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1511 days.

(21) Appl. No.: 11/308,904

(22) Filed: May 24, 2006

(65) Prior Publication Data
US 2006/0235980 A1    Oct. 19, 2006

Related U.S. Application Data

(63) Continuation of application No. 11/161,459, filed on Aug. 4, 2005, and a continuation of application No. 11/060,199, filed on Feb. 17, 2005, now Pat. No. 7,370,224, and a continuation of application No. 10/950,253, filed on Sep. 27, 2004.

(51) Int. Cl.
*G06F 15/173*    (2006.01)
*H04L 12/66*    (2006.01)
*H04L 12/28*    (2006.01)

(52) U.S. Cl.
USPC ..................... 709/224; 370/352; 370/401

(58) Field of Classification Search
USPC ........................................................ 709/224
See application file for complete search history.

(56) References Cited

U.S. PATENT DOCUMENTS

| | | | |
|---|---|---|---|
| 7,747,672 B1 * | 6/2010 | Marwah | 709/200 |
| 2003/0167343 A1 * | 9/2003 | Furuno | 709/244 |
| 2004/0160947 A1 * | 8/2004 | Hardy et al. | 370/352 |
| 2004/0208185 A1 * | 10/2004 | Goodman et al. | 370/401 |
| 2006/0002520 A1 | 1/2006 | Bettis et al. | |
| 2006/0025141 A1 | 2/2006 | Marsh et al. | |
| 2006/0029051 A1 | 2/2006 | Harris et al. | |
| 2006/0039367 A1 | 2/2006 | Wright et al. | |

OTHER PUBLICATIONS

Ingate—Maintain Security in a SIP-Based converged network; Partner application brief-Multivoip™ SS, Multi-Tech Systems, pp. 1-2; 2006; Downloaded around Mar. 2006.

VOIP PBX Software; Sphericall—voip-info.org downloaded from http://www.spherecom.com, pp. 1- 4; Sun 05 of Mar. 2006 [22:38]; Downloaded around Mar. 2006.

* cited by examiner

*Primary Examiner* — Phuoc Nguyen
*Assistant Examiner* — Adam Cooney
(74) *Attorney, Agent, or Firm* — Law Firm of Naren Thappeta (57) ABSTRACT

Providing fail_over call processing services by sniffing signaling traffic, without the overhead of configuring/provisioning terminals (phones), call servers etc. According to an aspect of the present invention, the integrated device operates as a backup call server when external call servers are unavailable. In one embodiment, the integrated device checks whether a first call server, to which a call setup request is destined to, is available, and forwards the request to another call server if the first call server is unavailable. According to another aspect, the integrated device detects the access information of each terminal registering with a call server, and uses the detected information to provide responses to call setup requests when the call servers are unavailable. As a result, the IP phones in a local network can continue initiating calls even when call servers located at remote sites, become unavailable.

17 Claims, 6 Drawing Sheets

ENABLING VOIP CALLS TO BE INITIATED WHEN A CALL SERVER IS UNAVAILABLE

RELATED APPLICATIONS

The present application is related to the following co-pending US Patent applications, all having the assignees of the subject application as a common assignee, which are all incorporated in their entirety herewith:

1. Bearing Ser. No. 10/950,253, entitled, 'System and Method for Enabling Management Functions in a Network', filed: Sep. 27, 2004;

2. Bearing Ser. No. 11/060,199, entitled, 'System and Method for Enabling Redundancy in PCI-Express Architecture', filed: Feb. 17, 2005; and 3. Bearing Ser. No. 11/161,459, entitled, 'Auto-Configuration of Network Services Required to Support Operation of Dependent Network Services', filed: Aug. 4, 2005.

BACKGROUND

1. Field of the Invention

The invention is generally related to the field of Voice over Internet Protocol (VoIP) based communication systems, and more specifically to a method and apparatus for enabling VoIP calls to be initiated when a call server is unavailable.

2. Related Art

Voice over Internet Protocol (VoIP) generally refers to a technology in which voice signals are represented in digital form and transported over networks using Internet Protocol (IP). The digital data representing the voice signal may be generated by a terminal (e.g., phone or personal computer). Another terminal at the other end may receive the digital data, and generate the audio signal for a user at the other end.

A first terminal ("source terminal") generally establishes a call with a second terminal ("target terminal") prior to transferring digital data representing voice signal. Establishing a call generally entails sending data packets indicating interest to establish a session and exchanging necessary data so that the data packets related to the voice call can be reliably exchanged between the two terminals. Session Initiation Protocol (SIP) is one common protocol (others include Media Gateway Control Protocol (MGCP) and H.323, well known in the relevant arts) used for establishing such sessions for voice calls. For additional details on SIP, the reader is referred to a document entitled request for comments (RFC) 3261 available from the Internet Engineering Task Force (IETF).

Call servers are often used in establishing calls between terminals in VoIP environments. In general, call servers contain the access information (e.g., the IP address) of each (target) terminal that can be accessed by VoIP. Accordingly, each terminal which can operate as a target terminal may first register its access information with a designated call server ("registrar").

Then, the source terminals may first send a call setup request ("Invite" packet in the case of SIP) to a local call server, which locates the registrar having the access information of a target terminal and forwards the call setup request to the registrar. The registrar then forwards the request to the target terminal (e.g., based on a telephone number or extension) and a sequence of handshakes may occur between the two terminals to establish the call.

Therefore, source terminals are often provided the access information (e.g., by appropriate configuration) of one or more (local or otherwise) call servers so that one of the call servers can be contacted during a call setup process. Thus, without access to a call server, many source terminals may be unable to initiate new calls.

One general requirement in VoIP environments is that the support for calls be continued even when a call server becomes unavailable (either because of outage of the underlying network or non-operation of the server). In other words, it is desirable that VoIP calls be facilitated (with as many VoIP related features as possible, which would otherwise be provided when primary call server is available) even in such a scenario.

In one prior approach, each source terminal is configured with information on multiple calls servers. Each source terminal may then contact one of the available call servers to initiate calls. A source terminal may determine the availability of each call server based on one of several known techniques (e.g., ping utility or receiving a response to packets sent during call establishment).

One possible problem with such an approach is that each source terminal may need to be configured with the access information of all the call servers. Another possible problem with such a solution is that each terminal may cause unneeded bandwidth overhead trying to determine whether each call server is accessible.

These problems/requirements may be of particular concern in branch office type environments which are often characterized by unreliable connectivity to main offices which may house call servers, and also by low budgets/infrastructure/low bandwidth connectivity/network personnel support. Due to such characteristics, a branch office may not have a local dedicated call server, and also not have a reliable connectivity to call servers located in main offices. Accordingly, the personnel in the branch office may not be able to initiate calls, even to terminals in the branch office when connectivity is lost to the main office.

In such environments also, it is desirable that personnel within a branch office be able to initiate calls.

BRIEF DESCRIPTION OF DRAWINGS

The present invention will be described with reference to the accompanying drawings, which are described below briefly.

DETAILED DESCRIPTION OF THE PREFERRED EMBODIMENTS

1. Overview and Discussion of the Invention

An integrated device provided according to an aspect of the present invention operates both as a switch and also as a call server which responds to the call setup requests only when an external call server is unavailable. Thus, more resources (e.g., money spent) may be expended on the external call server to provide superior features when the external call server is available, and yet have the capability to gracefully degrade to a lesser feature-rich functionality by the operation of the integrated device when the external call server becomes unavailable.

According to one more aspect of the present invention, the integrated device first redirects all call setup requests (with destination address to a primary server) to a secondary server by changing the destination address when a primary call server is unavailable. The integrated device starts responding to the call setup requests only when any primary and secondary servers are unavailable.

According to yet another aspect of the present invention, the integrated device monitors registration requests directed to other call servers to determine access information of various terminals. The determined access information is then used to respond to call setup requests. As a result, the integrated device can operate as a backup call server (when primary/secondary servers are unavailable) without any configuration changes in any of the source terminals.

The features described above can also be implemented alone or in combination in various devices as suitable for the specific environments.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
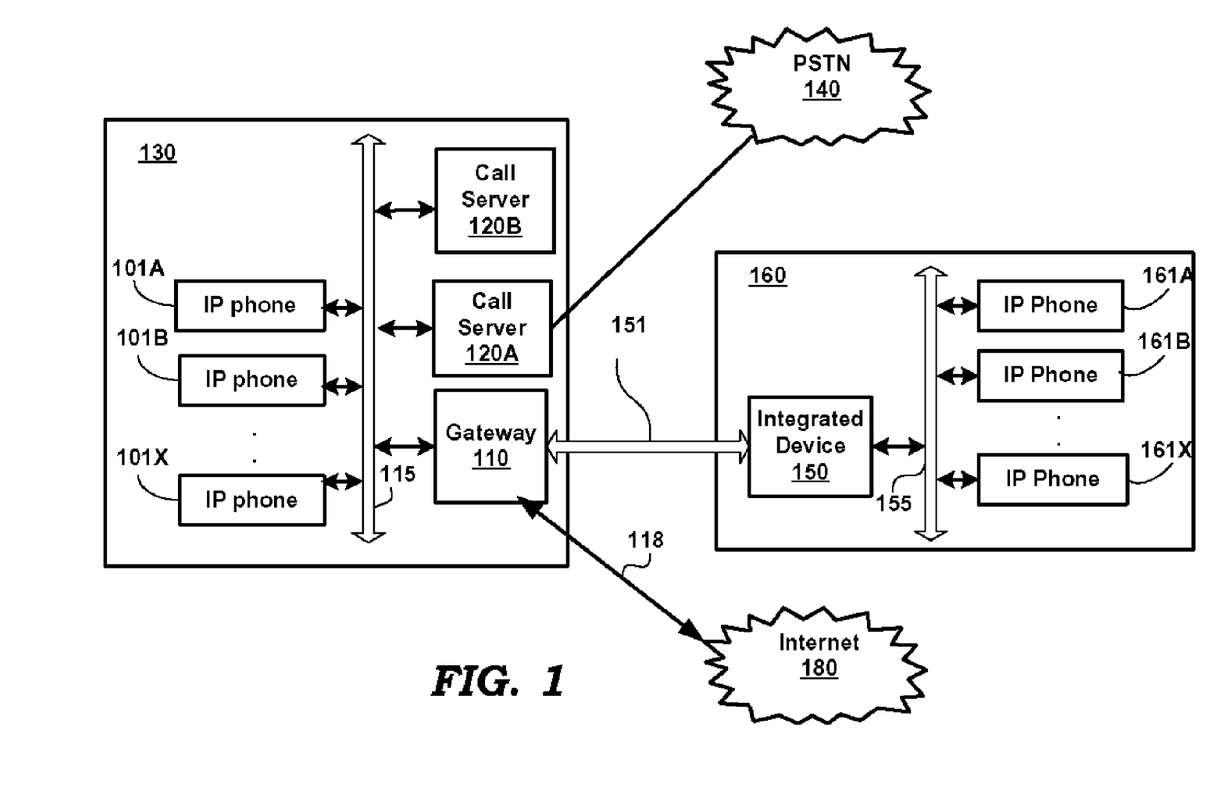
FIG. 1 is a block diagram illustrating the details of an example environment in which various aspects of the present invention can be implemented.

FIG. 1 is a block diagram illustrating the details of an example environment in which various aspects of the present invention can be implemented. The environment is shown containing a Head Quarters (HQ) 130, Branch office (BO) 160, Internet 180, and PSTN (public switched telephone network) 140. HQ 130 is shown containing IP phones 101A-101X, LAN 115, gateway 110, primary call server120A and secondary call server 120B. BO 160 is shown containing IP Phones 161A-161X, LAN 155 and gateway 150. Each block is described below in further detail.

PSTN 140 represents the network which facilitates calls to be made to (and received from) various telephones. Internet 180 represents a conglomeration of networks which communicate with each other using Internet Protocol (IP) and the systems of HQ 130 and BO 160 are also viewed as being part of the conglomeration of networks due to the connection by link 118.

Gateway 110 operates as a router in conjunction with integrated device 150 to provide connectivity between the systems in BO 160 and the systems in HQ 130. Gateway 110 also provides connectivity to Internet 180 by sending/receiving packets on path 118 and thus some of the calls received from PSTN 140 may be extended to one of the terminals based on VoIP using appropriate hardware/software.

Call servers 120A and 120B facilitate calls between various terminals, in addition to/from PSTN 140. For simplicity, it is assumed that each call server operates both as a registrar (at which terminals register the access information) as well as primary servers (which receive the call setup requests). Thus, each of call servers 120A and 120B receives registration requests indicating the access information (e.g., IP address) of all the registering terminals. A call server may then receive a call setup request from a source terminal, and send a response containing the access information of the target terminal.

A suitable protocol/convention may be designed such that the registration information in one of the call server is also available in all the other servers. For example, a suitable protocol may be employed to propagate the registration requests received in one call server to another call server. In general, each call server may be configured with (or otherwise provided, for example, by a name/resource server) the addresses of the other call servers, and synchronization protocols may be implemented to propagate the registration information on one to the other. Such synchronization will be apparent to one skilled in the relevant arts. Other approaches well known in the relevant arts can also be used to ensure that information in the registration requests is available in all the call servers.

Thus, from the viewpoint of each terminal either of the call servers can serve as a primary call server for processing call setup requests. For illustration of several features in the description below, it is assumed that call server 120A operates as a primary call server and call server 120B operates as a secondary call server.

IP phones 101A-101X and 161A-161X represents terminals which permit users to make phone calls to each other. Each IP phone converts the voice signal into digital data and sends the digital data to the target phone using IP. Each IP phone may be configured with (or otherwise provided) the access information of a call server so that the IP phone can register its (the phone's) access information, as well as send setup requests when initiating a call to a target IP phone of interest. Once a response to the call setup request is received, the source IP phone sets up the call with the target device using one of several known techniques.

Integrated device 150 operates as a gateway providing IP connectivity between the systems in BO 160 and HQ 130. In addition, integrated device 150 enables voice calls to be initiated even when a call server (that a terminal is configured to operate with) is unavailable, as described in sections below.

3. Transparent Redirect to Secondary Sever

Figure 2:
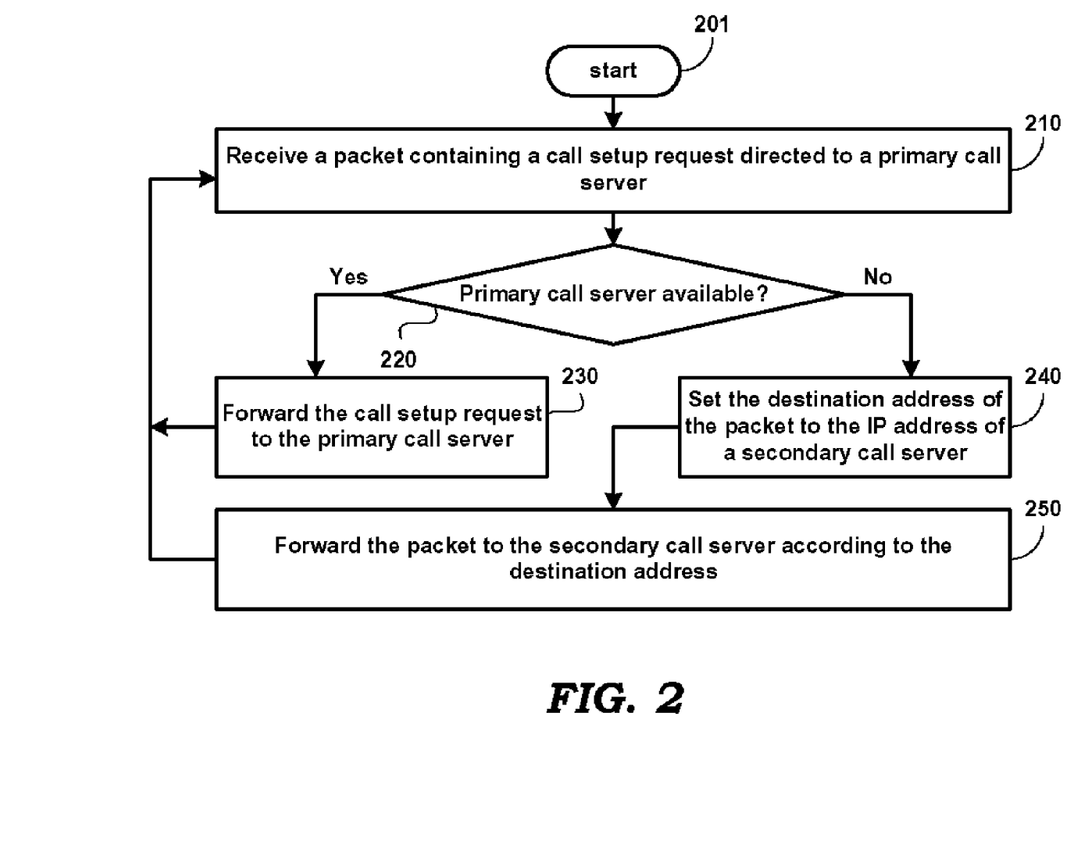
FIG. 2 is a flowchart illustrating the manner in which any of several call servers can be used for processing call setup requests, without having to configure a source terminal to access all the call servers.

FIG. 2 is a flowchart illustrating the manner in which any of several call servers can be used for processing call setup requests, without a source terminal having to know (or being configured to access all the call servers) the specific call server processing the request. The flowchart is described with respect to FIG. 1 merely for illustration. However, the features can be implemented in other environments, as will be apparent to one skilled in the relevant arts based on the disclosure provided herein. The flowchart starts in step 201, in which control transfers to step 210.

In step 210, integrated device 150 receives a packet containing a call setup request directed to a (primary) call server. That is, the packet would contain data representing a call setup request according to a pre-specified convention (e.g., SIP protocol, noted above) and the destination address of the packet would equal the IP address of the (primary) call server.

In step 220, integrated device 150 checks whether the primary call server is available. Such checking can be based on one or more of various approaches. For example, the basic accessibility of the server can be checked periodically (at an interval specified by the user) using utilities such as ICMP (Ping) or the application accessibility on the server can be checked using the keep alive messages (provided by the OPTION tags) feature provided by the SIP protocol (RFC 3261 section 11 entitled, "11 Querying for Capabilities"). As yet another alternative, integrated device 150 may be registered as a terminal device, causing the call server to send keep-alive messages periodically (which can be used as the basis for determining the availability of the call server).

While the checking is shown in the loop merely for illustration, it should be appreciated that operations to determine accessibility of each server can be determined independent of the processing of the call setup requests and data can be stored indicating the status of the various call servers. In such a scenario, the checking of step 220 merely entails examining the data.

From step 220, control passes to step 230 if the primary call server is available and to step 240 otherwise. In step 230, integrated device 150 forwards the call setup request to the primary call server. The forwarding may be caused by operation as a routing device. Control then passes to 210.

In step 240, integrated device 150 sets the destination address of the packet to the IP address of a secondary call server (assuming the secondary call server is determined to be available). Assuming the received packet (containing the call setup request) has a destination address equaling the IP address of call server 120A and that call server is determined to be unavailable, integrated device 150 sets the destination address to the IP address of call server 120B (assuming that call server 120B is determined to available). Any other fields (e.g., checksum field for TCP/IP) required to be changed also may be computed and set appropriately.

In step 250, integrated device 150 forwards the packet to the secondary call server (i.e., 120B) according to the destination address. The secondary call server may then send a response to the call setup request. The source terminal initiating the call may then contact the target terminal based on the response, and continue with the call as desired. Control then passes to step 210 to process the next setup request.

From the above, it may be appreciated that integrated device 150 operates to transparently redirect the call setup requests to any of the available call servers in case some of the call servers are unavailable. Accordingly, each terminal (IP Phone) may simply need to be configured with the access information of only one of the call servers, thereby simplifying the configuration task as well as avoiding traffic overhead on network (line 151).

However, it should be appreciated that all call servers are shown provided only in HQ 130, and is common in several scenarios. This is because there are several small branch offices and it may be desirable to expend more resources in central/main offices and share that infrastructure with the systems in the branch offices. Unfortunately, such a situation would make the systems in branch offices vulnerable to failure of line 151 (which can occur often).

In particular, with respect to VoIP, IP phones 161A-161X may not be able to communicate with each other even though LAN 155 is available, since call setup requires access information from the call servers located in HQ 130. Without having to implement another call server in BO 160 and while facilitating IP phones 161A-161X to rely on the (possibly rich set of) features provided by call servers 120A and 120B, integrated device 150 enables the IP phones of BO 160 to communicate with each other when call servers 120A and 120B are both unavailable, as described below in further detail.

4. Integrated Device Providing Connectivity

Figure 3:
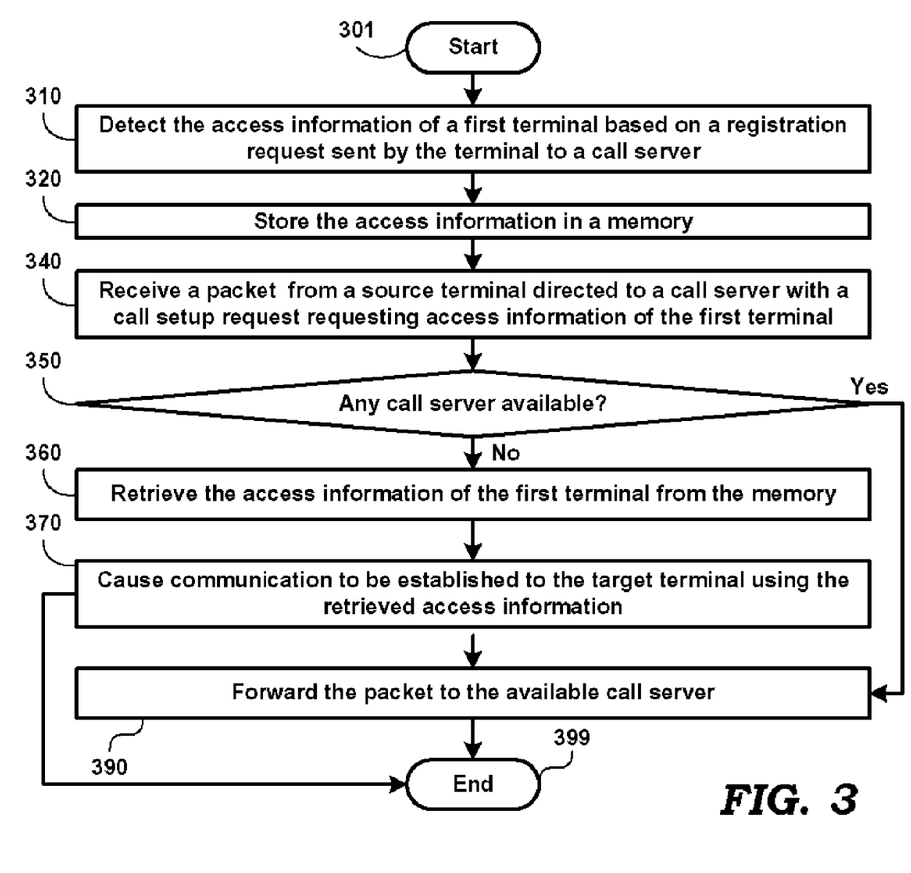
FIG. 3 is a flowchart illustrating the manner in which continued connectivity can be provided between terminals when primary/secondary call servers become unavailable.

FIG. 3 is a flowchart illustrating the manner in which continued connectivity can be provided between terminals when primary/secondary call servers become unavailable. The flowchart is described with respect to FIG. 1 merely for illustration. However, the features can be implemented in other environments, as will be apparent to one skilled in the relevant arts based on the disclosure provided herein. The flowchart starts in step 301, in which control transfers to step 310.

In step 310, integrated device 150 detects the access information (e.g., the IP address) of the first terminal (e.g., IP Phones) based on a registration request sent by the terminal to a call server. As may be appreciated, the registration request would be contained in an IP packet, and the access information of the first terminal can be determined based on the content of the packet. In case of registration requests using the SIP protocol, the access information would be present in the payload (e.g., CONTACT field of the SIP REGISTER packet) of the packet.

In step 320, integrated device 150 stores the detected access information (e.g., the IP address, phone number, cached (user) profile) of the first terminal in a memory. The data/information can be conveniently stored in components such as random access memories (RAM), caches, or registers for convenient fast access later. In one embodiment, the information is stored in the form of a table having columns for a terminal's telephone number (or extension) and the IP address of the terminal. Various other parameters such as expiry information may also be stored, as would be apparent to one skilled in the relevant arts.

In step 340, integrated device 150 receives a packet from a source terminal to a call server (either 120A or 120B) with a call setup request requesting access information of the first terminal. That is, the payload of the packet would indicate that the packet represents a call setup request to the first terminal according to a pre-specified convention (e.g., SIP protocol, noted above) and the destination address of the packet would equal the IP address of the call server.

In step 350, integrated device 150 checks whether any call server (120A or 120B) is available for processing the call setup request. The approaches described above with respect to step 220 can be used to check the availability of each call server. From step 340, control passes to step 390 if any call server is available and to step 360 otherwise.

In step 390, integrated device 150 forwards the call setup request to an available call server, preferably to the call server the packet is directed to, that is, as specified by the destination (IP) address of the packet. Accordingly, the forwarding may be caused by operation of integrated device 150 as a IP routing device. The call server may then forward the call setup request to the target terminal specified in the call setup request, and any handshakes needed to complete establishing the call may be performed between the two terminals. Control then passes to step 399, where the flowchart ends.

In step 360, integrated device 150 retrieves the access information from the memory noted in step 320. In step 370, integrated device 150 cause communication to be established between the source terminal and the target terminal using the retrieved access information. In the case of SIP, integrated device 150 may operate as a local call server and forward the call INVITE request to the target terminal using the retrieved access information. The target terminal exchanges various packets (OK, TRYING, RINGING, etc., in SIP) to setup the call thereafter. Other techniques, suited the specific environments, can be used to cause the communication to be established.

Control then transfers to step 399. It should be appreciated that steps 310 and 320 may be executed as one loop, which populates the memory with the access information, and steps 340-390 may be executed in parallel as another loop to process the call setup requests.

From the description of FIG. 3, it may be appreciated that integrated device 150 operates to enable VoIP calls to be initiated when call servers 120A and 120B are unavailable. Such a feature can be implemented without any additional configuration changes to the IP phones since the access information is gathered without requiring a change to the normal registration process and the responses are generated from the gathered information without requiring a change to the normal call setup request process.

In addition, as call servers 120A/120B are used when they are available, IP phones may receive any/all advanced features provided by such call servers. Accordingly, an organization may be able to invest more in the call servers in the main offices and provide superior level of services to IP phones in the branch offices when connectivity is present to the branch offices, and guarantee minimal connectivity services locally when the connectivity is lost (without requiring configuration at the IP phones).

Furthermore, in combination with the features of FIG. 2, integrated device 150 may first cause any of the available call servers to serve the call setup requests, and use locally stored information of FIG. 3 only when any of such call servers are unavailable. Thus, the user is guaranteed at least local connectivity when the call servers are unavailable.

The features described above can be implemented in various environments as a combination of one or more of hardware, software and firmware, as suited for the specific environment. The description is continued with respect to an example environment in which the features can be implemented.

5. Architecture of Integrated Device

Figure 4:
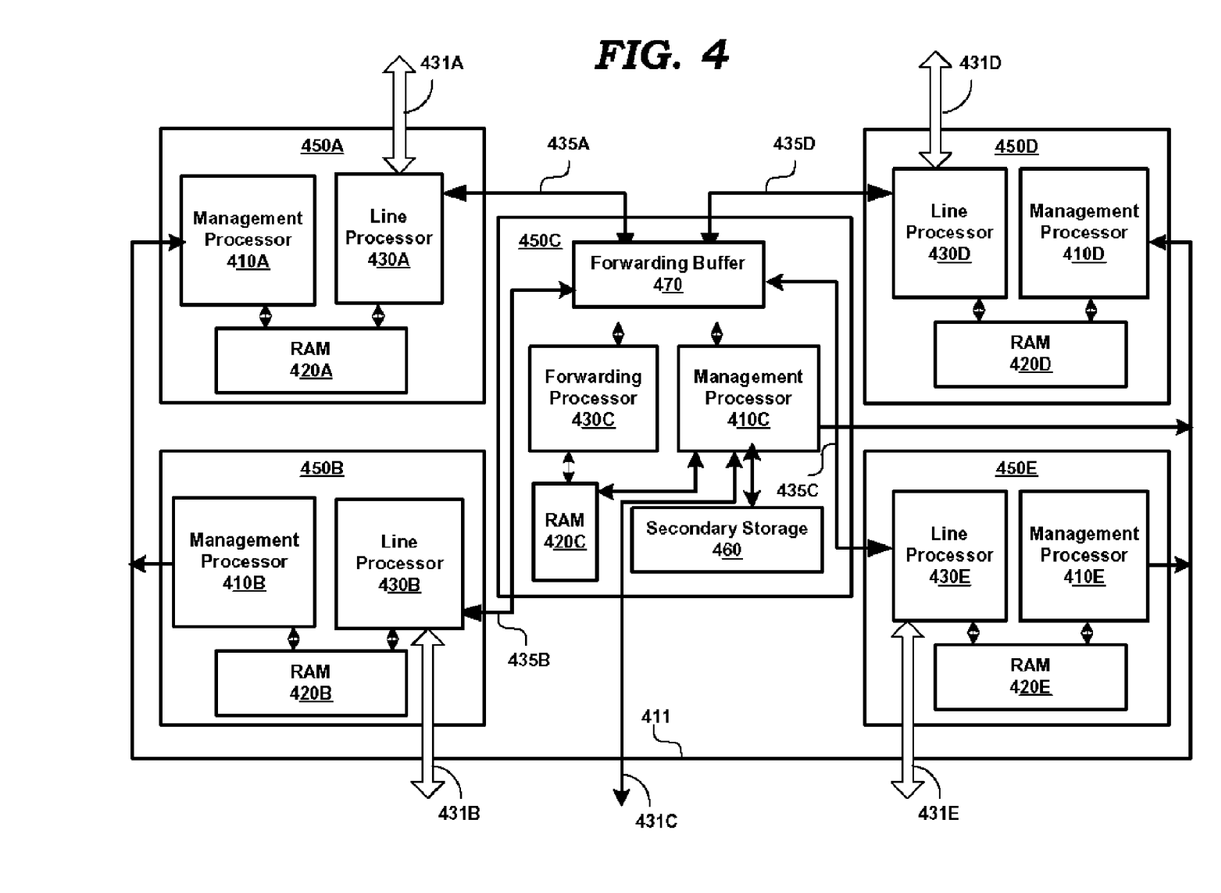
FIG. 4 illustrates the details of the architecture of an integrated device in one embodiment of the present invention.

FIG. 4 illustrates the details of Integrated device 150 in one embodiment. Integrated device 150 is shown containing management processors 410A-410E, management memories (RAM) 420A-420E, line processors 430A, 430B, 430D, and 430E, forwarding processor 430C, secondary storage 460, and forwarding buffer 470. The management processors are shown connected by management bus 411, and line processors 430A, 430B, 430D and 430E are shown connected via forwarding processor 430C.

Each pair of a management processor and forwarding processor may be contained in a corresponding card. Thus cards 450A, 450B, 450D and 450E are respectively shown containing {management processor 410A and line processor 430A}, {management processor 410B and line processor 430B}, {management processor 410D and line processor 430D}, {management processor 410E and forwarding processor 430E}. Thus, forwarding of packets across cards occurs via card 450C (and is referred to as a main processing system), while forwarding buffer 470 is used to store packets between the forwarding operations. Each RAM 420A-420E is used by the corresponding management/line processor for in-memory configuration/provisioning information and any required local storage/buffering/execution of instructions.

In an embodiment, each forwarding processor is implemented using Opteron (TM) processor available from Advanced Micro Devices Inc., One AMD Place, Sunnyvale, Calif. 94088, Phone: (408) 749_4000, each management processor is implemented using IXP processor available from Intel Corporation, and the line processor depends on the specific type of connection (e.g., Mindspeed corporation for T1 interface, Marvel Corporation for Ethernet). The management processors are shown connected by Ethernet bus 411, while the line processors are connected to forwarding processor 430C by corresponding PCI Express Interface (435A-435D), well known in the relevant arts.

Broadly, management processors 410A-410E provide various management features, health monitoring of services, notification, time stroke alerts, logging, etc., (requiring high reliability). Only the details of management/line/forwarding processors as relevant to an understanding of the features of the present invention are described in detail in this document.

For further details, the reader is referred to the co-pending applications referred to above in the Related Applications section.

Broadly, each line processor receives data to be routed/switched on a corresponding interface(s) (e.g., T3, Ethernet, etc., as shown by corresponding bidirectional path), and stores the corresponding packet in forwarding buffer 470. Forwarding processor 430C determines the specific line card on which to forward each packet stored in forwarding buffer 470. In addition, forwarding processor 430C may implement various features such as security applications, NAT, firewall, IPSec, VoIP, in conjunction with the forwarding operation. The forwarding decisions are generally based on various forwarding tables (e.g., routing table in the case of IP). Each packet is then transmitted by the corresponding line processor.

In one embodiment, the features (substantially) described above with respect to FIGS. 2 and 3 are implemented within forwarding processor 430C, along with security/NAT/VOIP type applications. Accordingly, the description is continued with respect to implementation in a forwarding processor.

6. Implementation in Forwarding Processor

Figure 5:
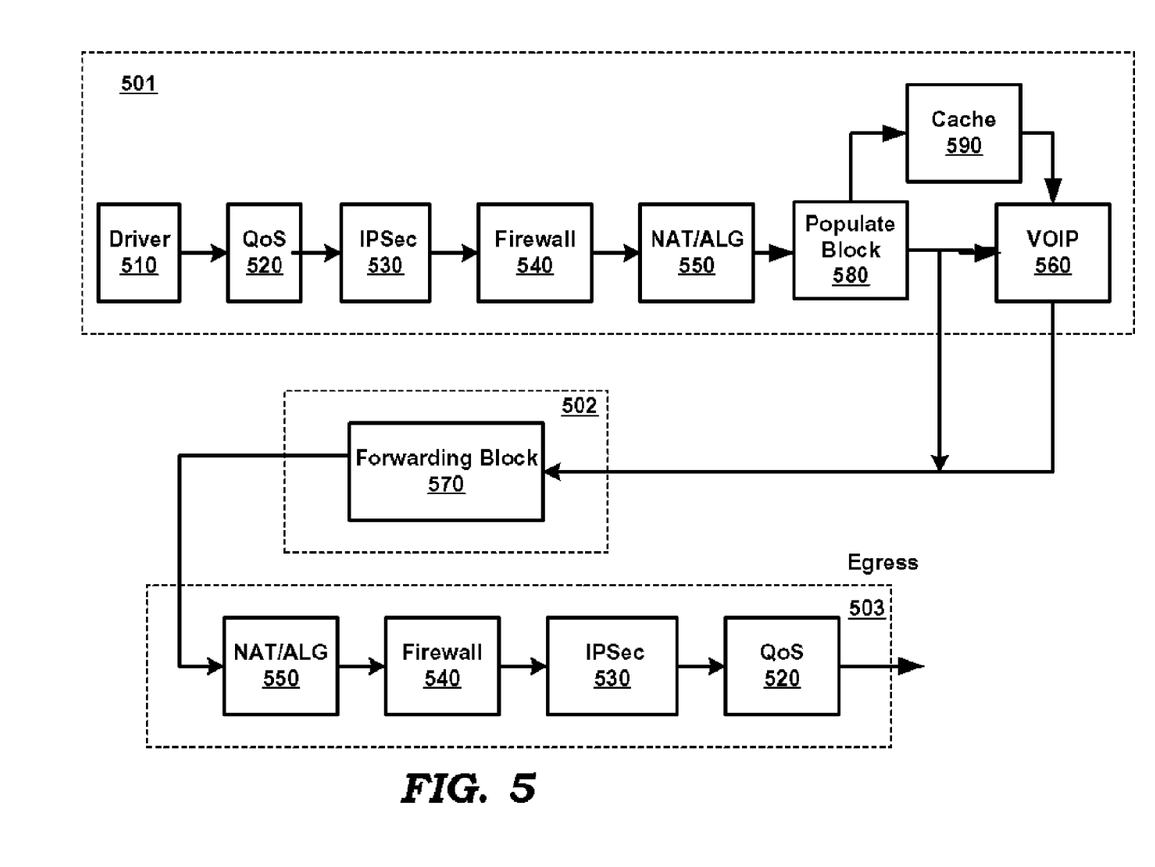
FIG. 5 is a block diagram illustrating the details of processing of packets by network services executing in an integrated device in one embodiment.

FIG. 5 is a block diagram illustrating the manner in which packets are processed by various services in an embodiment of the present invention. As shown, a packet is processed in three phases—(1) ingress processing 501; (2) forwarding processing 502; and (3) egress processing 503. Each of the services may operate individually in both ingress processing and egress processing, and forwarding processing is shared by all the services together. In addition, each service may be viewed as a block implemented in an appropriate combination of one or more of hardware (e.g., of FIG. 4), software and firmware.

With respect to ingress processing 501, a packet received by driver 510 of a line processor is first processed by QoS service 520. Firewall 540, network address translation/application layer gateway (NAT/ALG) 550, routing protocol 500C, IP Security Protocol (IPSec) 530, voice over IP (VOIP) 560, and QoS 520 represent various services which are executed in forwarding processor 430C in one embodiment.

Packets requiring higher priority are marked accordingly (by QoS service 520), and subsequent services process such packets with a higher priority. In this embodiment, it is assumed that there are only two priorities such that the higher priority packets (marked as such) are selected for processing ahead of other waiting packets by each subsequent service. The priority aspect is not described expressly in other services, as the corresponding processing may otherwise (i.e., other than sequence of selection) be the same for both high and low priority packets.

After QoS service 520, each packet is processed by IPsec service 530, which provides various security features forming the basis for VPNs and secure dial-up access, in a known way. Firewall 540 filters (or avoids forwarding) various packets, and thus generally assures that systems (internal or external to HQ 130/BO 160) are safe from intruders.

NAT/ALG 550 performs any needed network address translations in the content of a packet to support private addresses. In general, the NAT block determines the translation of a private address to public address or vice versa, and the ALG block determines any additional translations that need to be performed in the IP payload consistent with the application to which the payload data relates.

Thus, ALG block supports the translations needed for SIP protocol for the VoIP applications to execute appropriately. NAT/ALG 550 may forward only the packets with the self IP address (also described in below paragraphs) in the destination field to VoIP 560, and the remaining packets are sent directly to forwarding block 570, as shown by the two paths.

In addition, according to an aspect of the present invention, NAT/ALG 550 monitors the availability of each call server (using approaches such as PING or communication with the application layer, at intervals potentially specified by a user). In case a call setup request has the destination address of an unavailable call server, NAT/ALG 550 changes the destination address to that of an available call server. Any other required fields (e.g., checksum, noted above) may also be changed in the packet. The packet with the changed destination address is thus forwarded by the following services to the available call server.

According to another aspect of the present invention, NAT/ALG 550 upon determining that none of external call servers 120A/120B is available, changes the destination IP address to a self address (i.e., an IP address assigned to integrated device 150), which causes VoIP 560 to process the packet as described below.

VoIP 560 is designed to operate as a backup call server with limited functionality when the external call servers are unavailable. To support such a feature, populate block 580 examines each call registration packet to determine the access information of each terminal (seeking to register the corresponding access information) and stores the access information in cache 590. The table described with respect to step 320 may be stored in cache 590.

When VoIP 560 receives a call setup request with an IP address equaling the self-address, VoIP 560 uses the information in cache 590 to cause communication to be established between the source terminal and the target terminal. In case of SIP environments, VoIP 560 forwards the invite packet to the target terminal (IP phone) using the access information available in cache 590. Such forwarding may entail generating a new packet using some of the information in the received call setup request and also the retrieved access information. The format of the new packet may need to be consistent with RFC 3261 in case of SIP.

Once the target terminal receives the SIP invite packet, communication is established between the two terminals and the call may established by exchanging the packets as specified in SIP. As a result, source terminals in BO 160 may initiate calls to other terminals in the same 1 office, even when call servers 120A and 120B are unavailable.

Forwarding processing 502 (forwarding block 570) determines the specific interface each packet in forwarding buffer 470 is to be forwarded on. The specific processor is generally determined based on routing/forwarding tables setup by routing protocol (which is implemented within forwarding block 570 in a known way, in one embodiment). Once the specific processor/interface is determined, the packet is further processed by egress processing 503.

With respect to egress processing 503, the packets are again processed by NAT/ALG service 550, firewall 540, IPSec 530, and QoS service 520. In general, each of these services may be implemented according to respective 'functional' requirements (generally well known in the relevant arts). The packets which are to be forwarded on different interfaces after desired Egress processing operations, are stored in forwarding buffer 470.

Thus, using an architecture such as above, various features in relation to VoIP may be provided. It may be further desirable to implement the features of FIGS. 2 and 3 substantially in the form of software (e.g., to minimize cost). Accordingly, the description is continued with respect to an alternative embodiment in which the features are operative upon execution of the appropriate software instructions.

7. Software Implementation

Figure 6:
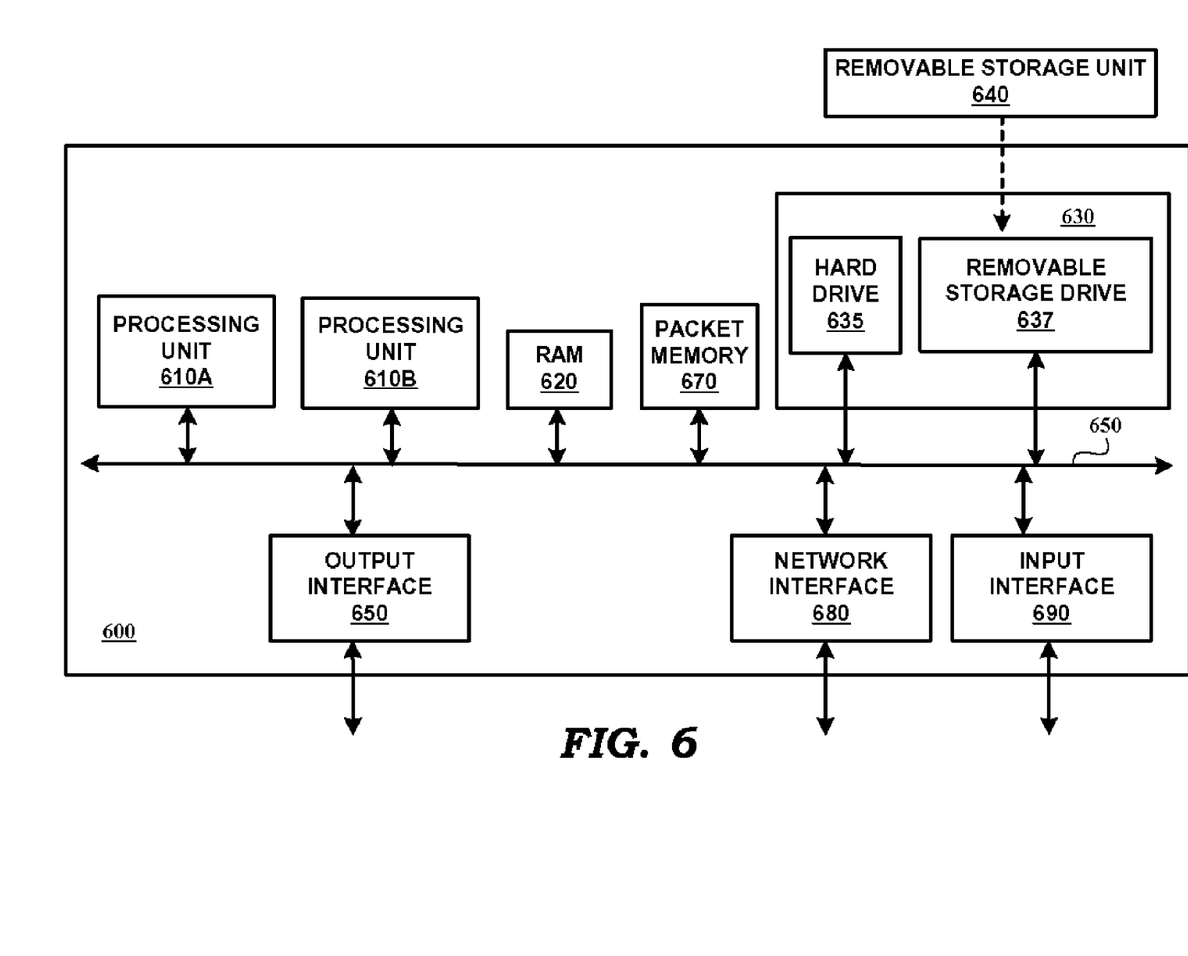
FIG. 6 is a block diagram illustrating the details of a system in which various aspects of the present invention are operative by execution of software instructions.

FIG. 6 is a block diagram illustrating the details of digital processing system 600 in one embodiment. System 600 may correspond to integrated device 150. System 600 is shown containing processing unit 610, random access memory (RAM) 620, secondary memory 630, output interface 660, packet memory 670, network interface 680 and input interface 690. Each component is described in further detail below.

Input interface 690 (e.g., interface with a key_board and/or mouse, not shown) enables a user/administrator to provide any necessary inputs to system 600. Output interface 660 provides output signals (e.g., display signals to a display unit, not shown), and the two interfaces together can form the basis for a suitable user interface for an administrator to interact with system 600. The administrator may provide information on various (primary/secondary) call servers that are available for registration as well as to process call setup requests.

Network interface 680 may enable system 600 to send/receive data packets to/from other systems on corresponding paths using protocols such as internet protocol (IP). Network interface 680, output interface 660 and input interface 690 can be implemented in a known way.

RAM 620, secondary memory 630, and packet memory 670 may together be referred to as a memory. RAM 620 receives instructions and data on path 650 (which may represent several buses) from secondary memory 630, and provides the instructions to processing unit 610 for execution. RAM 620 may be used to store the various tables (e.g., routing table and access information of the IP phones) described above.

Packet memory 670 stores (queues) packets waiting to be forwarded (or otherwise processed) on different ports/interfaces. Secondary memory 630 may contain units such as hard drive 635 and removable storage drive 637.

Some or all of the data and instructions may be provided on removable storage unit 640 (or from a network using protocols such as Internet Protocol), and the data and instructions may be read and provided by removable storage drive 637 to processing units 610. Floppy drive, magnetic tape drive, CD_ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620. In general, processing unit 610 reads sequences of instructions from various types of memory medium (including RAM 620, storage 630 and removable storage unit 640), and executes the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of supporting Voice Over Internet Protocol (VoIP) calls on a first network, said method being performed in a device addressable by a first IP address, said method comprising:

detecting, in said device addressable by said first IP address, an access information of a first terminal from a registration request generated by said first terminal and directed to a call server, wherein said call server is addressable by a second IP address, and wherein said registration request has a destination address equaling said second IP address, wherein said access information specifies a third IP address of said first terminal such that said first terminal can be accessed on said first network using said third IP address in a destination field of corresponding packets;

storing said access information of said first terminal in a memory, said access information specifying that said first terminal is addressable by said third IP address;

determining whether said call server is unavailable;

receiving a call setup request with a destination address equaling said second IP address such that said call setup request is directed to said call server, wherein said call setup request is from a second terminal and requests said access information of said first terminal, wherein said call server is provided external to said device;

forwarding said call setup request to said call server if said call server is determined to be available;

if said call server is determined to be unavailable:
retrieving said access information from said memory upon receiving of said call setup request; and
sending said access information retrieved from said memory to said second terminal, whereby said second terminal communicates with said first terminal by using said third IP address contained in the received access information, thereby establishing a call between said second terminal and said first terminal using said retrieved access information whereby said first terminal is required to register only with said call server, and whereby said second terminal is required to direct call setup requests to only said call server to establish calls with said first terminal even if said call server is unavailable.

2. The method of claim 1, wherein said device connects said first network to a second network via a communication path, both of said first terminal and said second terminal being located in said first network and said call server being located in said second network, said method further comprising:

receiving said registration request from said first terminal on said first network, wherein said registration request is directed to said call server by having a destination address equaling said second IP address, wherein said detecting comprises examining said registration request and wherein said storing is performed after said detecting, wherein said examining is performed by said device addressable by said first IP address; and forwarding said registration request to said call server on said communication path.

3. The method of claim 2, wherein said device comprises a router, said call setup request being contained in a IP packet having a destination address equaling said second IP address of said call server, said method further comprising:

determining to forward said IP packet on said communication path based on said destination address if said call server is determined to be available.

4. The method of claim 3, further comprising:

receiving a second call setup request directed to said call server, said second call setup request being from a third terminal and requests access information of said first terminal, wherein said second call setup request is contained in a packet with a destination address equaling said second IP address of said call server, changing said destination address to a fourth IP address of another call server in said packet if said call server is determined to be unavailable, wherein said another call server is configured to be addressable by said fourth IP address; and forwarding to said another call server said packet with said destination address changed to the address of said another call server, whereby said packet with said fourth IP address of said another call server is processed by said another call server to establish said communication between said third terminal and said first terminal.

5. A method of supporting Voice Over Internet Protocol (VOIP) calls in a router connecting a first network to a second network, wherein a first call server is connected on said first network, said router being addressable by a first IP address, and said first call server being addressable by a second IP address, said method comprising:

determining in said router whether said first call server is available to process call setup requests;

receiving in said router a first call setup request in the form of a packet having a destination address field equaling said second IP address such that said first call setup request is directed to said first call server, said first call setup request being received from a first terminal requesting access information of a second terminal, wherein said first call setup request is received for, and prior to, setting up a call between said first terminal and said second terminal, wherein data representing voice can be exchanged between said first terminal and said second terminal only after said call is established, but not before said call is established between said first terminal and said second terminal; and sending from said router said first call setup request to said first call server if said first call server is determined to be available to process call setup requests, and to a second call server otherwise, wherein said first call setup request is sent from said router with said destination address field equaling said second IP address if said first call server is determined to be available, wherein said router replaces said second IP address in said destination address field with a fourth IP address before sending said packet to said second call server if said first call server is determined to be unavailable to process call setup requests, wherein said second call server being addressable by said fourth IP address, whereby said first terminal is required to direct call setup requests to only said first call server and said router facilitates using of said second call server to process call setup requests if said first call server is determined to be unavailable.

6. The method of claim 5, wherein said sending comprises changing said destination address field from said second IP address to said fourth IP address of said second call server if said first call server is determined to be unavailable.

7. A non-transitory computer readable medium storing one or more sequences of instructions for enabling a device addressable by a first IP address to facilitate VoIP calls to be initiated on a first network, wherein execution of said one or more sequences of instructions by one or more processors contained in said device causes said one or more processors to perform the actions of:

detecting an access information of a first terminal from a registration request generated by said first terminal and directed to a call server, wherein said call server is addressable by a second IP address, and wherein said registration request has a destination address equaling said second IP address, wherein said access information specifies a third IP address based on which of said first terminal such that said first terminal can be accessed on said first network using said third IP address in a destination field of corresponding packets;

storing said access information of said first terminal in a memory, said access information specifying that said first terminal is addressable by said third IP address;

determining whether said call server is unavailable;

receiving a call setup request with a destination address equaling said second IP address such that said call setup request is directed to said call server, wherein said call setup request is from a second terminal and requests said access information of said first terminal, wherein said call server is provided external to said device;

forwarding said call setup request to said call server if said call server is determined to be available;

if said call server is determined to be unavailable:

retrieving said access information from said memory upon receiving of said call setup request; and         sending said access information retrieved from said memory to said second terminal, whereby said second terminal communicates with said first terminal by using said third IP address contained in the received access information, thereby establishing a call between said second terminal and said first terminal using said retrieved access information,     whereby said first terminal is required to register only with said call server, and     whereby said second terminal is required to direct call setup requests to only said call server to establish calls with said first terminal even if said call server is unavailable.

8. The non-transitory computer readable medium of claim 7, wherein said device connects said first network to a second network via a communication path, both of said first terminal and said second terminal being located in said first network and said call server being located in said second network, said method further comprising:

receiving said registration request from said first terminal on said first network, wherein said registration request is directed to said call server by having a destination address equaling said second IP address, wherein said detecting comprises examining said registration request and wherein said storing is performed after said detecting, wherein said examining is performed by said device addressable by said first IP address; and     forwarding said registration request to said call server on said communication path.

9. The non-transitory computer readable medium of claim 8, wherein said device comprises a router, said call setup request being contained in a IP packet having a destination address equaling said second IP address of said call server, execution of said one or more sequences of instructions by one or more processors contained in said device causes said one or more processors to perform the further actions of:

determining to forward said IP packet on said communication path based on said destination address if said call server is determined to be available.

10. The non-transitory computer readable medium of claim 8, further comprising one or more instructions for:

receiving a second call setup request directed to said call server, said second call setup request being from a third terminal and requests access information of said first terminal,     wherein said second call setup request is contained in a packet with a destination address equaling said second IP address of said call server,     changing said destination address to a fourth IP address of another call server in said packet if said call server is determined to be unavailable, wherein said another call server is configured to be addressable by said fourth IP address; and     forwarding to said another call server said packet with said destination address changed to the address of said another call server,     whereby said packet with said fourth IP address of said another call server is processed by said another call server to establish said communication between said third terminal and said first terminal.

11. The non-transitory computer readable medium of claim 7, wherein said causing comprises forwarding said call setup request to said first terminal using said access information.

12. A non-transitory computer readable medium storing one or more sequences of instructions for causing a router to facilitate VoIP calls to be initiated on a first network, wherein said router connects a first network to a second network, wherein a first call server is connected on said first network, said router being addressable by a first IP address, and said first call server being addressable by a second IP address, wherein execution of said one or more sequences of instructions by one or more processors contained in said router causes said one or more processors to perform the actions of:

determining in said router whether said first call server is available to process call setup requests;

receiving in said router a first call setup request in the form of a packet having a destination address field equaling said second IP address such that said first call setup request is directed to said first call server, said first call setup request being received from a first terminal requesting access information of a second terminal,     wherein said first call setup request is received for, and prior to, setting up a call between said first terminal and said second terminal, wherein data representing voice can be exchanged between said first terminal and said second terminal only after said call is established, but not before said call is established between said first terminal and said second terminal; and     sending from said router said first call setup request to said first call server if said first call server is determined to be available to process call setup requests, and to a second call server otherwise,     wherein said first call setup request is sent from said router with said destination address field equaling said second IP address if said first call server is determined to be available,     wherein sending of said first call setup request to said second call server comprises sending said packet with destination address equaling a fourth IP address, said second call server being addressable by said fourth IP address, whereby said first terminal is required to direct call setup requests to only said first call server and said router facilitates using of said second call server to process call setup requests if said first call server is determined to be unavailable.

13. The non-transitory computer readable medium of claim 12, wherein said sending comprises changing said destination address field from said second IP address to said fourth IP address of said second call server if said first call server is determined to be unavailable.

14. An integrated device addressable by a first IP address and containing a plurality of interfaces, each of said plurality of interfaces connecting to a corresponding one of a plurality of paths, said integrated device comprising:
a memory;
a populate block detecting an access information of a first terminal from a registration request generated by said first terminal directed to an external call server, wherein said external call server is addressable by a second IP address, and wherein said registration request has a destination address equaling said second IP address, wherein said access information specifies a third IP address of said first terminal such that said first terminal is addressable on said first network using said third IP address in a destination field of corresponding packets, said populate block storing said access information in said memory, said access information specifying that said first terminal is addressable by said third IP address;
a router block receiving a plurality of packets and determining a specific one of said plurality of paths on which to forward each of said plurality of packets based on a destination address of the corresponding packet,
said router block to received a first packet containing a call setup request having a destination address equaling a second IP address, wherein said external call server is addressable by said second IP address such that said first packet is directed to said external call server, said call request packet being generated by a second terminal and requesting said access information of said first terminal,
said router block to forward said first packet to said external call server if said external call server is available to process call setup requests; and
if said external call server is unavailable to process call setup requests:
a VoIP module receiving said call setup request directed to said external call server, said VoIP module retrieving said access information from said memory and sending the retrieved access information as a response to said second terminal,
wherein said second terminal establishes a call with said first terminal based on receiving the retrieved access information, wherein data representing voice is exchanged between said first terminal and said second terminal only after said call is established, but not before said call is established,
whereby said first terminal is required to register only with said call server, and
whereby said second terminal is required to send setup requests with destination address set to said second IP address of said call server to establish calls with said first terminal even if said external call server is unavailable.

15. The integrated device of claim 14, further comprising:
a network address translation (NAT) block monitoring the availability of said external call server and setting a destination address of said call setup request to said first IP address as a self-address of said integrated device if said external call server is unavailable,
wherein said VoIP module receives said call setup request only if said destination address equals said self-address.

16. An integrated device for supporting Voice Over Internet Protocol (VOIP) calls, said integrated device connecting a first network to a second network, wherein a first call server is located in said second network, said router being addressable by a first IP address, and said first call server being addressable by a second IP address, said device comprising:
a first block for determining whether said first call server is available to process call setup requests;
a second block receiving from said first network a first call setup request in the form of a packet having a destination address field equaling said second IP address such that said first call setup request is directed to said first call server,
said second block sending said first call setup request to said first call server on said second network if said first call server is determined to be available, wherein the destination address of said first call request sent to said first call server equals said second IP address;
if said first call server is determined to be unavailable to process said first call setup request:
said second block setting said destination address field of said first call request to a fourth IP address, wherein a second call server is addressable by said fourth IP address such that said first call setup request is sent to said second call server,
said first call setup request being received from a first terminal and requesting access information of a second terminal,
wherein said first call setup request is received for, and prior to, setting up a call between said first terminal and said second terminal, wherein data representing voice can be exchanged between said first terminal and said second terminal only after said call is established, but not before said call is established between said first terminal and said second terminal,
wherein said integrated device is implemented external to said first call server, second call server, said first terminal and said second terminal,
whereby said first terminal is required to direct call setup requests to only said first call server and said router facilitates using of said second call server to process call setup requests if said first call server is determined to be unavailable.

17. The integrated device of claim 16, wherein said first block comprises a network address translation (NAT) block, wherein said first call setup request contains an address of said first call server in a destination address field, said NAT block sets said destination address field to an IP address of said second call server if said first call server is not available to process call setup requests.

* * * * *